(12) United States Patent
Raaymakers et al.

(10) Patent No.: US 8,023,376 B2
(45) Date of Patent: Sep. 20, 2011

(54) FAST DISC RECOGNITION BY ELIMINATION OF CALIBRATIONS

(75) Inventors: Jeroen Arnoldus Leonardus Johannes Raaymakers, Eindhoven (NL); Herman Van Der Kall, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 673 days.

(21) Appl. No.: 11/576,526

(22) PCT Filed: Sep. 22, 2005

(86) PCT No.: PCT/IB2005/053136
§ 371 (c)(1),
(2), (4) Date: Sep. 16, 2008

(87) PCT Pub. No.: WO2006/038141
PCT Pub. Date: Apr. 13, 2006

(65) Prior Publication Data
US 2009/0003164 A1    Jan. 1, 2009

(30) Foreign Application Priority Data
Oct. 8, 2004  (EP) .................................. 04104949

(51) Int. Cl.
*G11B 20/00* (2006.01)
(52) U.S. Cl. ................. 369/53.1; 369/44.28; 369/44.29; 369/47.3
(58) Field of Classification Search ............... 369/44.29, 369/47.53, 47.55, 53.19, 53.28, 44.28, 53.1
See application file for complete search history.

(56) References Cited

U.S. PATENT DOCUMENTS

| | | | |
|---|---|---|---|
| 4,907,212 A * | 3/1990 | Pharris et al. ............... | 369/44.26 |
| 5,424,885 A * | 6/1995 | McKenzie et al. .......... | 360/77.05 |
| 5,745,458 A * | 4/1998 | Oliver et al. ................ | 369/53.28 |
| 5,790,491 A * | 8/1998 | Jaquette et al. ............. | 369/47.53 |
| 5,808,982 A * | 9/1998 | Yun .............................. | 369/44.28 |
| 6,636,467 B1 * | 10/2003 | Taussig ........................ | 369/47.3 |
| 6,697,310 B1 | 2/2004 | Kuriuzawa et al. | |
| 6,738,328 B2 * | 5/2004 | Koide .......................... | 369/47.28 |
| 7,457,213 B2 * | 11/2008 | Hsu et al. .................... | 369/47.28 |
| 7,492,684 B2 * | 2/2009 | Chang et al. ................ | 369/53.19 |
| 2002/0110064 A1 * | 8/2002 | Yen et al. .................... | 369/47.53 |
| 2002/0136115 A1 * | 9/2002 | Kadlec et al. ............... | 369/44.29 |
| 2002/0176333 A1 * | 11/2002 | Lin ............................... | 369/44.29 |
| 2003/0107963 A1 * | 6/2003 | Tani ............................. | 369/47.53 |
| 2004/0213107 A1 * | 10/2004 | Yokokawa .................. | 369/47.55 |
| 2004/0257949 A1 * | 12/2004 | Hsu et al. ..................... | 369/59.2 |
| 2009/0046555 A1 * | 2/2009 | Hsu et al. .................... | 369/53.35 |

FOREIGN PATENT DOCUMENTS

| | | |
|---|---|---|
| JP | 11016256 | 1/1999 |
| WO | 03025931 | 12/2003 |

OTHER PUBLICATIONS

Written Opinion of the International Searching Authority PCT/IB2005053136.

* cited by examiner

*Primary Examiner* — Thuy Pardo

(57) ABSTRACT

A method and a device for fast disc recognition for use in read/write performances when an optical disc is connected to an optical drive, including the provision of a set S of parameters for safe data transfer between the drive and the disc, the direct calibration during a disc recognition step only of those parameters out of said set S in need of a direct calibration, the start of a read/write data transfer sequence after said disc recognition step is finalized and the calibration of the remaining parameters at first after or during one or more data transfer read/write sequences.

8 Claims, 2 Drawing Sheets

FAST DISC RECOGNITION BY ELIMINATION OF CALIBRATIONS

Figures 1, 2:
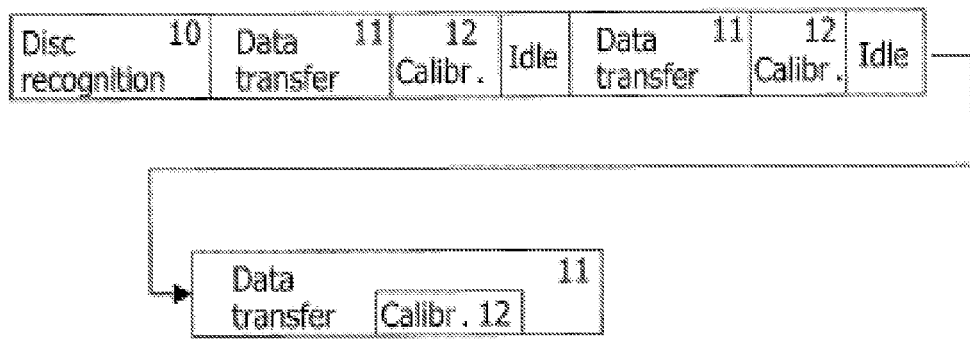

The present invention refers to optical drives for reading data from information carriers as well as writing data on information carriers. Information carriers can be optical discs like CD, DVD or Blu Ray discs. Particularly, the invention has as an object to shorten the start-up time until a read/write data transfer can start after the connection of a disc for read/write data from/to the disc.

Currently available optical drives need to cope with an ever increasing number of optical disc types, for example CD RO/R/RW, DVD SL RO/+R/+RW/-R/-RW, DVD DL RO/+R/-R. Next to CD and DVD the Blu-ray disc is proposed for the third generation of optical discs to be developed. Besides all the SL and DL variants the Blu-ray disc family also contains different capacities for all these variants, e.g. BD SL RO discs are available in capacities of 23, 25 and 27 Gb. All drives need to have the ability to discriminate between these disc types. The procedure for this discrimination as a functionality present in a drive is called disc recognition. After a disc recognition step has been performed in a drive, provided with a new disc, a lot of calibrations of certain parameters are performed to optimize a read channel and/or a write channel of the drive. These parameters are, as some examples, focus offset, radial tilt, spherical aberration and tangential tilt. The calibrations of these parameters are time consuming, typically 0.5 s is needed for the calibration of each parameter. Time for disc recognition and time for the calibration processes are part of the start-up time of an optical drive. Start-up time is a very important drive specification point. The shorter start-up time, the better performance.

The calibration process is discussed in patent No. U.S. Pat. No. 6,697,310 B1. In this document it is stated that an execution of the calibration process is temporarily suspended till the termination of a regeneration or recording of sequential data that is read into a disc storage. The problem addressed in this document regards how to carry out the calibration during transfer of time-sequentially continuous data streams. In this disclosure there is nothing stated about start-up delays due to calibration processes initialized during the start-up of an optical drive.

One object of the invention is to reduce the start-up time of an optical drive so that read/write data transfer can start in a shortened time after the connection of a disc for read/write data from/to the disc.

According to one aspect of the present invention there is disclosed a method for the transfer of data between an optical drive and an information carrier, comprising the steps of:
  connecting an information carrier to the optical drive,
  performing information carrier recognition step measures between the information carrier and the optical drive,
  providing a set S of parameters for safe data transfer between the drive and the information carrier,
  calibrating directly during the information recognition step only those parameters out of said set in need of a direct calibration,
  a read/write data transfer sequence starts after said information carrier recognition step is finalized and
  calibrating remaining parameters at first after or during one or more data transfer read/write sequences.

According to a further aspect of the invention there is disclosed a device as specified in the independent optical drive claim comprising a device for performing the method as specified in claim 1.

According to further aspects of the invention the method includes the steps of:
  performing tests during the disc recognition step to determine if a parameter from the set S of parameters needs to be directly calibrated and
  generating a list of parameters to be calibrated after the information recognition step, is performed.

According to the aspects of the invention it is provided a method for skipping the calibration of the parameters for optimizing the read and write channel during the recognition step, which is a prevailing step in prior art technology. This is possible if the read/write quality is better than a predefined level. The skipped calibration of said parameters will be performed late during read/write or during a transfer pause if required. It should be mentioned here that most calibrations are required only for bad examples of discs, such as out-of-specification discs. It can be added here that calibration is not always performed. For example, calibration may be skipped if certain quality measures are attained, such as jitter below a certain level.

In streaming applications, such as use of AV-drives, the skipped calibration during the recognition stage can be performed during read/write periods of time. This is possible because all AV-drives have a certain over speed with respect to a required bit rate as requested by the application. When the drive's and/or the application's buffer is full calibration can easily be performed. Execution of these calibrations can be part of the design of the streaming of the video data from and to the engine. Even at acceptable read/write quality the calibrations should be performed to prevent read/write errors in due time. These calibrations performed have no effect on a streaming AV application at all.

Also in a drive which does not perform any calibrations during streaming read/write it is also an advantage to skip calibrations during disc recognition (if it is allowed according to a test performed as described below). The advantage is simply the faster startup time of the drive.

In data drives it is even simpler to perform the invention as there are no real-time requirements of data transfer. For read-only discs the calibrations may be skipped until 1) no read action is requested from the host or 2) an unrecoverable read error occurs. The first case does not affect the drives throughput performance. For the second case the throughput is lower than compared to case 1. However, the throughput rate is not lowered when compared to prior art methods and devices, as a calibration is required to read the data.

By use of the method according to the invention 1 up to 2 seconds can be gained in start-up time of the DVD or Blu-ray single (SL) discs. For the dual layer (DL) variants the gain can be in the order of up to 3 seconds, when compared to prior art. These gains in time are considered to be very advantageous from the perspective of a user.

An additional advantage obtained by use of the present invention is that the skipped calibrations are performed faster because the disc rotational speed during read/record speed is generally larger then the disc speed during disc recognition. (The execution speed of the calibrations is often linked to the disc rotational speed, i.e. a calibration takes typically 10 disc revolutions).

These and other aspects of the invention will be apparent from and elucidated with reference to the embodiment(s) described hereinafter:

FIG. 1 discloses schematically the sequences of data exchange between the optical drive and an optical disc according to prior art during start-up of the drive;

FIG. 2 discloses the corresponding sequences of data exchange between the optical drive and an optical disc according to an aspect of the invention.

Figure 3A:
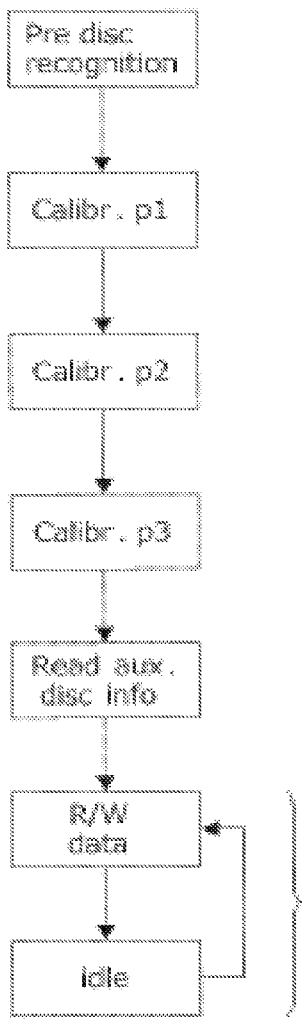
Figure 3B:
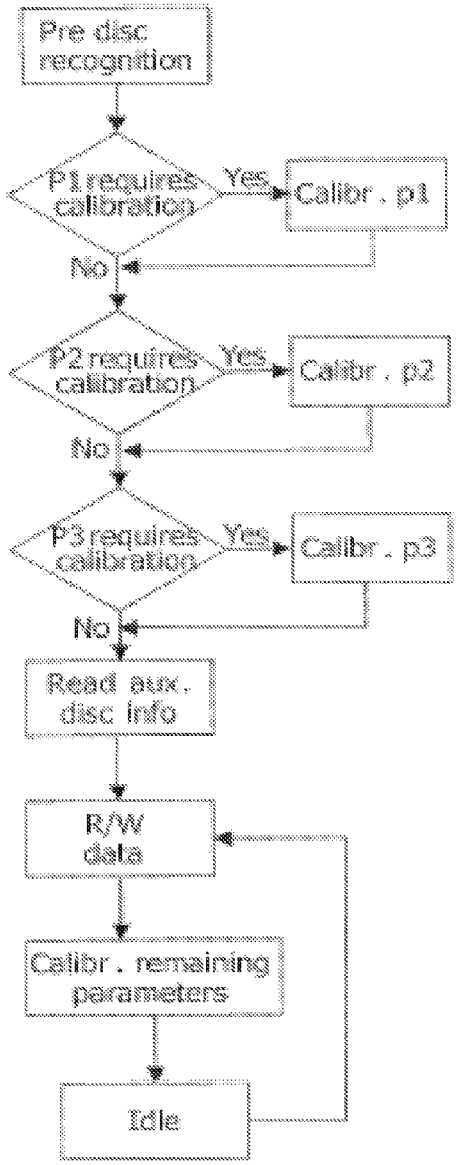

FIG. 3a shows a flow chart of disc recognition and calibration steps according to prior art and FIG. 3b shows a flow chart of disc recognition and calibration steps according to the invention.

In FIG. 1, there is shown schematically a sequence of the data exchange between the optical drive and an optical disc of the mentioned type according to prior art. The sequence starts with a disc recognition block 1. During this disc recognition sequence a calibration of a set of parameters such as focus offset, radial tilt, spherical aberration and tangential tilt is performed to optimize the read/write settings. In case of dual layer discs (DL) it is also possible that a drive can calibrate some of the parameters for both layers.

After the disc recognition phase, wherein the calibration is included, has been carried out a number of data transfer blocks 2 with transfer of the relevant data for read/write from/to the disc follows. The data transfer blocks 2 are separated by idle blocks 3 without activity and accordingly without data transfer between the drive and the disc.

FIG. 2 illustrates the speed-up method according to an aspect of the invention. Before data transfer can start, the start-up of the drive begins, also in this case, with a disc recognition block indicated in the diagram of FIG. 2 as block 10 of a time diagram showing a time scale and the corresponding data exchange sequence between an optical drive and an optical disc connected to the drive. The start-up in this case refers to a disc recognition procedure that starts when a new disc has been connected to the drive. The start-up may further refer to a disc recognition procedure following a switch-on of the optical drive after the drive has been switched-off for a while and wherein the calibration settings have not been saved although the disc connected is still the same after the switch-on.

According to one aspect of the invention the disc recognition phase, block 10 of the diagram in FIG. 2 does not contain any calibration phase (block 10 could contain a calibration if the test "P1 requires calibration" is evaluated to "yes"). Thus data transfer can be initiated immediately when the shortened disc recognition step, block 10, has ended, which is indicated in FIG. 2 as the data transfer block 11 which starts earlier in the time scheme representing the inventive example. A comparison between FIGS. 1 and 2 shows this very clearly as the time sequences of prior art and the inventive examples are indicated to start at the same time and they are equal in scale.

The disc recognition phase, block 10, is a sequence that includes a detection of the parameters (from set S) in need of calibration.

A set S of parameters to be calibrated are predetermined, e.g. the parameters listed previously. Disc recognition measures include checking if a calibration is required. A test is performed, the outcome of which determines if none or all parameters from the set S must be calibrated. The test can be a simple test, for example if the readout jitter is below a certain value, e.g. if jitter <8% then the readout performance is of sufficient quality and direct calibrations are not required. The test can also be a specific test for a certain parameter from the set S of parameters. Of course it is possible to use multiple tests and only skip a part of the calibrations of the parameters from set S.

A further example of a test for a parameter, p1, could be:
measure jitter with nominal setting of parameter p1 (e.g. radial tilt),
perturbate parameter p1,
measure jitter again,
if the change of jitter is large, this parameter is sensitive so it is good to calibrate it directly during the disc recognition step.

The calibration is performed in this embodiment of the invention after one or more data transfer sequences, either during idle periods or during data transfer period, if this is possible in the application. Some calibrations are also possible to perform during read data transfer. Performing a calibration during write is much more difficult, but, at least in principle, is also possible. The calibration blocks are indicated by numeral 12 in the Figure. In said calibration blocks the drive is calibrated with respect to the parameters of a subset of parameters of set S based on the outcome of the tests performed during disc recognition.

FIG. 3a shows a flow chart representing the disc recognition and the calibration steps performed according to prior art. FIG. 3b shows a flow chart indicating a schematic disc recognition and the calibration steps as one example of the present invention. According to this example the disc recognition starts with a pre recognition step. After this, the drive is programmed to check if any of the parameters p1-pi test is found out to require calibration. If the specific parameter p1-pi is observed to require an immediate calibration, the found parameter is then directly calibrated during the disc recognition step. This is symbolized for the parameters p1-p3 in the Figure, wherein p2 and p3 are shown to be tested and (optionally) calibrated during the same stage in the flow chart. Auxiliary disc info is read from the disc in a subsequent step, whereupon data transfer can follow in the next step. The rest of the parameters p4-pi are then calibrated in the last step shown in the flow chart (calibr. pi), which is indicated to occur between or after data transfer sequences represented in the Figure as the block: R/W data.

FIG. 3b describes a case A, where a subset (p1 to p3) of parameters from the set S (p1 to pi) of parameters are tested during disc recognition (block 10) for the purpose of immediate calibrating if necessary. The untested parameters p4 up to pi and the parameters from p1 to p3 which do not need immediate calibration during disc recognition are calibrated during data streaming.

Alternative embodiments of the calibration procedures (not shown in Figures) are:

Case B: Test all parameters p1 upto pi and calibrate a subset of p1 upto pi (e.g. p1 and p3) during disc recognition (block 10). Calibrate p1 upto pi during data streaming, i.e. during data transfer (R/W data).

Case C: Test all parameter p1 upto pi and calibrate a subset of p1 upto pi (e.g. p1 and p3) during disc recognition (block 10). Calibrate 'the rest' (e.g. p2 and p4 upto pi) during data streaming, i.e. during data transfer, (R/W data).

In a preferred embodiment all parameters are tested (preferably in a combined test such as jitter <8%) and all parameters are calibrated during R'W data. This corresponds with case B.

A generic description can be described as:
a 'knob' or setting which can be calibrated/optimized in an optical drive is called a parameter and is referred to as pi (e.g. p1=radial tilt, p2=tangential tilt, p3=focus offset, p4=spherical aberration, p5=equalizer gain),
all the parameters pi are put in a set S which contains all the parameters which can be calibrated by the drive (e.g. S={p1, p2, p3, p4, p5}),
a test is defined as a procedure to make a decision if a certain set of parameters pi (which is a subset of S) is in need of direct (immediate) calibration. A test is referred to as Ti (e.g. T1=test if jitter is below 8%, T2=test if jitter is below 8%, T3=test sensitivity of jitter for perturbations of p1). All tests are put in a set E (e.g. E={T1, T2, T3}) and can be executed during the disc recognition phase. Each test is directly linked to one or more parameters from set S (e.g. T1->p1, p2, p3, p4, p5 and T2->p2, p3, p4, p5 and T3->p1),
during disc recognition one or more tests Ti are executed. Based on the outcome of the test some parameters are calibrated (e.g. "a simple implementation form": test T1, if jitter >8% calibrate p1 ... p5 directly. E.g. "a more elaborate implementation form": test T2, if jitter >8% calibrate p2 ... p5 directly. Test T3, if sensitivity of jitter for perturbations of p1 is too high calibrate p1 directly and
options during streaming:
  calibrate all parameters from S during streaming
  calibrate subset S' of parameters from S during streaming
Note: the subset S' can be built based on the outcome of the test(s) Ti performed during disc recognition.

The method according to the invention can be applied in all CD, DVD and Blu-ray optical devices, both in AV and DATA applications, where data transfer must be carried through between an optical drive and an optical disc.

Definition Of Terms Used In This Document
  Connection of a disc to a drive means one of:
  a disc is inserted into the drive,
  a drive is powered up when an (unknown) disc is already present in said drive or
  a disc present or inserted into an auxiliary unit is coupled to said drive for r/w of the disc.
  Disc recognition measures include e.g:
  presetting the drive-disc system and evaluating signals for determining disc type, such as reflection measurements, focus and radial initialization and capture, a search of a pregroove wobble and/or a HF signal and a check if it is possible to lock to this wobble and/or HF signals.

Of course the mechanism can also be applied for R/RW discs. Also for partly written R/RW media the startup time is increased and the time to transfer data from the disc to the host is reduced. However, to improve write quality it can be advantageous to execute the 'skipped calibrations' before the first write action.

The invention claimed is:

1. A method for transfer of data between an optical drive and an information carrier, comprising the steps of:
  connecting an information carrier to the optical drive,
  performing information carrier recognition between the information carrier and the optical drive including the steps of:
    (i) predetermining a set S of parameters to be calibrated,
    (ii) determining which parameters from the set S of parameters (p1-pi) require immediate calibration by performing one of a general test applicable to all parameters in the set S of parameters or individual tests of each parameter (p1-pi) in the set S of parameters,
    (iii) directly calibrating those parameters from the set S of parameters that are determined to require immediate calibration during said information carrier recognition step,
  generating a list of remaining parameters to be calibrated after the information carrier recognition step
  a read/write data transfer sequence starts after said information carrier recognition step is finalized and
  calibrating said remaining parameters after or during one or more data transfer read/write sequences.

2. The method according to claim 1, wherein at least one of the parameters from the group S of parameters include: focus offset, radial tilt, spherical aberration, tangential tilt, read channel settings and servo settings.

3. The method according to claim 1, wherein the read channel settings include at least one from the group of: equalizer, viterbi settings, p11 bandwidths.

4. An optical drive for reading and/or writing information from/to an information carrier, comprising a device for transfer of data between the drive and an information carrier connected to the drive, comprising:
  information carrier recognition means for performing information carrier recognition,
  calibration means for calibrating a set S of parameters for performing said data transfer,
  characterized in that said device further comprises:
  a processor programmed to perform an algorithm for calibrating directly during the information carrier recognition step only those parameters out of said set S in need of a direct calibration, said processor
  connecting an information carrier to the optical drive,
  performing information carrier recognition between the information carrier and the optical drive including the steps of:
    (i) predetermining a set S of parameters to be calibrated,
    (ii) determining which parameters from the set S of parameters (p1-pi) require immediate calibration by performing one of a general test applicable to all parameters in the set S of parameters or individual tests of each parameter (p1-pi) in the set S of parameters,
    (iii) directly calibrating those parameters from the set S of parameters that are determined to require immediate calibration during said information carrier recognition step,
  generating a list of remaining parameters to be calibrated after the information carrier recognition step
  calibrating said remaining parameters after or during one or more data transfer read/write sequences.

5. The optical drive according to claim 4, wherein said processor is further programmed to:
  perform a test during the information carrier recognition step to determine if a parameter from the set S of parameters needs to be directly calibrated.

6. The optical drive according to claim 5, wherein said processor is further programmed to: generate a list of parameters to be calibrated after the information carrier recognition step.

7. The optical drive according claim 4, wherein said processor is further programmed to calibrate at least one of the parameters from the group of: focus offset, radial tilt, spherical aberration, tangential tilt, read channel settings and servo settings.

8. The optical drive according to claim 4, wherein said processor is further programmed to:
  provide a set E of parameter tests, perform tests according to a subset of the set E of parameter tests during the information carrier recognition step, determine by means of the results of the tests performed during the information carrier recognition step a subset of the set S of parameters to be calibrated directly during the information carrier recognition step and to calibrate during R/W data transfer the parameters which remain to be calibrated.

* * * * *